United States Patent [19]

Takahashi

[11] Patent Number: 4,621,541
[45] Date of Patent: Nov. 11, 1986

[54] APPARATUS FOR CHANGING ROTATIONAL SPEED WITH THE AID OF CLUTCHING ACTIVITY

[76] Inventor: Takashi Takahashi, 26-18, Kamisoshigaya 1, Setagaya-ku, Tokyo 157, Japan

[21] Appl. No.: 617,464

[22] Filed: Jun. 5, 1984

[30] Foreign Application Priority Data

Aug. 4, 1983 [JP] Japan .................. 58-141841

[51] Int. Cl.$^4$ .................. F16H 57/10; F16H 3/44
[52] U.S. Cl. .................. 74/786; 74/785; 74/787
[58] Field of Search .................. 74/785, 786, 787

[56] References Cited

U.S. PATENT DOCUMENTS

| | | | |
|---|---|---|---|
| 2,340,241 | 1/1944 | Woods | 74/786 |
| 2,588,952 | 3/1952 | Baisch | 74/786 X |
| 2,913,061 | 11/1959 | Beyerstedt et al. | 74/786 X |
| 3,082,647 | 3/1963 | Banker | 74/785 |
| 3,308,686 | 3/1967 | Magg et al. | 74/785 X |
| 3,396,610 | 8/1968 | Rich, Jr. et al. | 74/785 X |
| 3,463,284 | 8/1969 | Kampert | 192/88 A |
| 3,893,352 | 7/1975 | Cotton | 74/786 X |
| 4,360,092 | 11/1982 | Müller et al. | 74/786 X |
| 4,422,349 | 12/1983 | Matsumoto et al. | 74/787 X |
| 4,494,414 | 1/1985 | Hamano | 74/785 X |

FOREIGN PATENT DOCUMENTS

| | | | |
|---|---|---|---|
| 647863 | 12/1950 | United Kingdom | 74/785 |
| 270422 | 11/1968 | U.S.S.R. | 74/786 |

Primary Examiner—Kenneth J. Dorner
Assistant Examiner—Dwight G. Diehl
Attorney, Agent, or Firm—Browdy and Neimark

[57] ABSTRACT

An apparatus for changing rotational speed with the aid of clutching activity comprises a planetary gearing mechanism disposed between an input shaft and an output shaft in a housing with an inner ring gear being rotatably supported therein, ring-shaped braking plates comprising an opposing pair of frictional plates, one of them being located on the outer periphery of the inner ring gear to rotate together with the latter and the other one being axially displaceably fitted into the inner periphery of the casing, the first mentioned frictional plate being located opposite to the last mentioned frictional plate, and a ring-shaped bellows located opposite to the last mentioned frictional plate to expand in the axial direction when pressurized fluid is filled therein and contract in the axial direction when it is discharged therefrom. When the ring-shaped bellows expands under the influence of hydraulic force, it comes in contact with the last mentioned frictional plate and thereby frictional clutching is accomplished between both the frictional plates. The planetary gearing mechanism may be constructed in the multistage structure and a ring-shaped bellows is allocated to each stage in the multi-stage structure.

4 Claims, 7 Drawing Figures

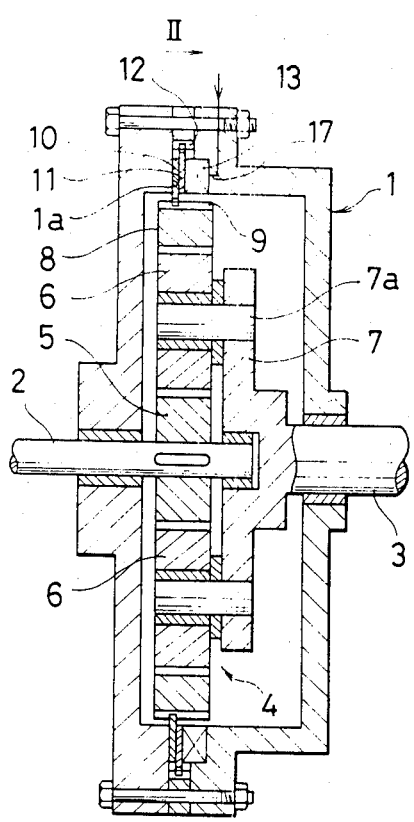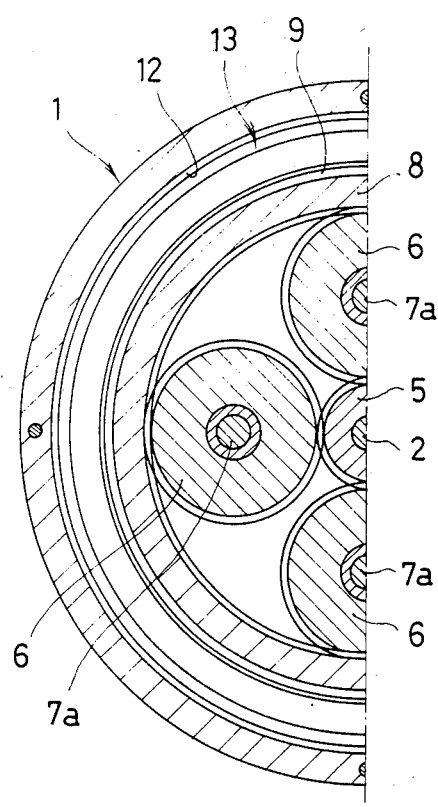

FIG.3
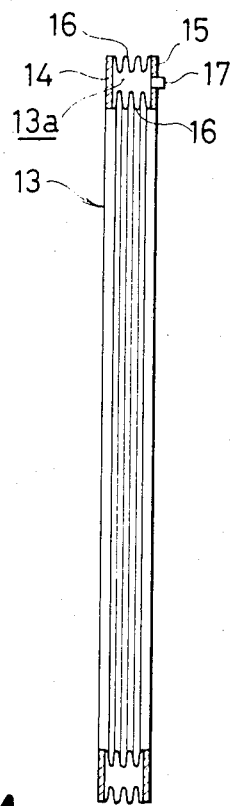
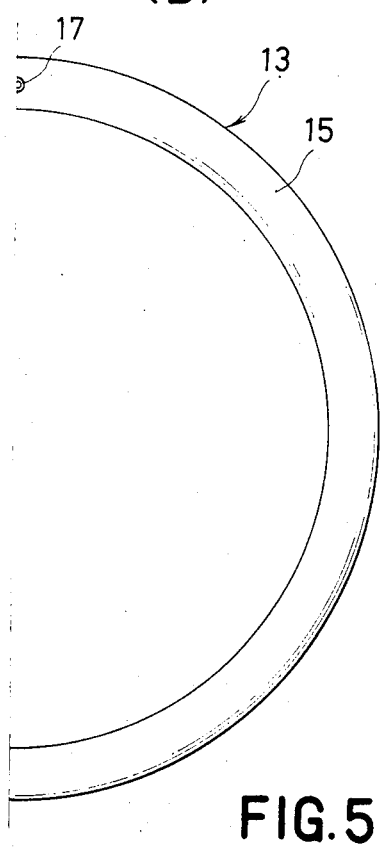
FIG.4
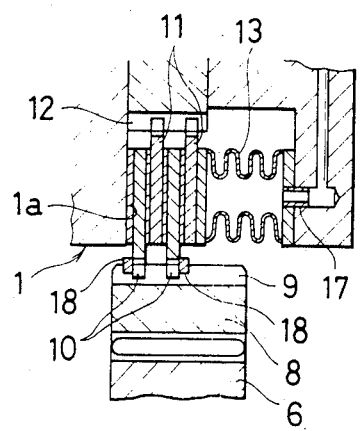
FIG.5
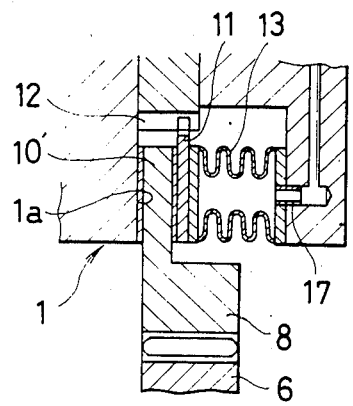

APPARATUS FOR CHANGING ROTATIONAL SPEED WITH THE AID OF CLUTCHING ACTIVITY

BACKGROUND

The present invention relates to an apparatus for changing rotational speed with the aid of clutching activity of the type including a planetary gearing mechanism.

The above-mentioned type of apparatus having a planetary gearing mechanism incorporated therein is hitherto known and it is generally constructed such that an inner ring gear is rotatably supported in the planetary gearing mechanism located between an input shaft and an output shaft and a hydraulic cylinder is mounted to come in operative contact with the inner ring gear. When it is actuated, the inner ring gear is braked and thereby power transmission is accomplished between both the input and output shafts. On the other hand, while the hydraulic cylinder is inoperative, the inner ring gear is not braked and thereby power transmission is interrupted therebetween.

To rotatably support the inner ring gear in operative association with the input shaft or output shaft, the conventional apparatus as constructed in the above-described manner has an arm or the like holding means incorporated therein. However, the arrangement of an arm or the like holding means made in that way so as to hold the inner ring gear on the input shaft or output shaft requires an additional space in which the arm or the like means is to be housed, causing the whole apparatus to be designed and constructed in larger dimensions. In addition, the apparatus becomes complicated in structure which makes it very difficult to perform maintenance services.

To brake the inner ring gear a high intensity of thrust force is usually required. To this end a conventional hydraulic cylinder or a ring-shaped hydraulic cylinder having the same dimensions as those of the inner ring gear to be braked is employed for generating a required intensity of thrust force but due to the mounting of the above-mentioned hydraulic cylinder the apparatus is unavoidably designed and constructed in larger dimensions and becomes more complicated.

SUMMARY

Hence, the present invention has been made with the foregoing background in mind.

It is a principal object of the present invention to provide an apparatus for changing rotational speed with the aid of clutching activity of the type including a planetary gearing mechanism incorporated therein which is simple in structure, light in weight and operates at a high working efficiency.

It is another object of the present invention to provide an apparatus for changing rotational speed with the aid of clutching activity of the type including a planetary gearing mechanism incorporated therein which is simple in structure, light in weight and includes braking means adapted to be actuated for braking the inner ring gear without generation of noise and occurrence of fast wearing.

It is a further object of the present invention to provide an apparatus for changing rotational speed with the aid of clutching activity of the type including a planetary gearing mechanism incorporated therein which has no necessity for employing any conventional hydraulic cylinder and instead of the latter includes a ring-shaped bellows adapted to generate a high intensity of thrust force without leakage of pressurized fluid.

To accomplish the above objects there is proposed according to the present invention an apparatus for changing rotational speed with the aid of clutching activity essentially comprising a planetary gearing mechanism disposed between an input shaft and an output shaft with an inner ring gear being rotatably incorporated therein, ring-shaped braking plate means comprising an opposing pair of frictional plates, one of them being located on the outer periphery of the inner ring gear to rotate together with the latter and the other one being axially displaceably fitted into the inner periphery of the casing, the first mentioned frictional plate being located opposite to the last mentioned frictional plate, and a ring-shaped bellows located opposite to the braking plate means to expand in the axial direction when pressurized fluid is filled therein and contract in the axial direction when it is discharged therefrom, the ring-shaped bellows being adapted to thrust the braking plate means to brake the inner ring gear when it is caused to expand.

In a preferred embodiment of the invention the planetary gearing mechanism is constructed in the multistage structure so that an inner ring gear rotatably supported in one of the stages in the multistage structure is selectively braked to achieve multistage speed changing.

The ring-shaped bellows adapted to brake the inner ring gear via the braking plate means has a thrusting surface of which annular configuration is defined along the outer periphery of the inner ring gear. Thus, it can be housed in a narrow space located around the outer periphery of the inner ring gear and moreover it can generate a high intensity of thrust force. Since thrust force generated by the ring-shaped bellows is effective in the axial direction of the inner ring gear but not in the radial direction of the same, there is no fear of causing the inner ring gear to be displaced eccentrically of the center axis thereof.

The inner ring gear rotatably supported in the housing is operatively associated neither with the input shaft nor with the output shaft but it is simply mounted around the group of planet gears. For the reason there is no necessity for arm or the like means which serves to rotatably support the inner ring gear. Thus, the apparatus can be constituted by a small number of components.

Other objects, features and advantages of the invention will become more clearly apparent from reading of the following specification which has been prepared in conjunction with the accompanying drawings.

THE DRAWINGS

The accompanying drawings will be briefly described below.

FIG. 1 is a vertical sectional view of an apparatus for changing rotational speed with the aid of clutching activity in accordance with an embodiment of the invention;

FIG. 2 is a left half of a sectional front view of the apparatus taken in line II—II in FIG. 1;

FIG. 3(A) is a vertical sectional view of a ring-shaped bellows employable for the apparatus as illustrated in FIGS. 1 and 2;

FIG. 3(B) is a right half of a front view of the ring-shaped bellows in FIG. 3(A);

FIG. 4 is a fragmental sectional view of the apparatus, particularly illustrating how the ring-shaped bellows serves as a thrust force generating member;

Figure 6:
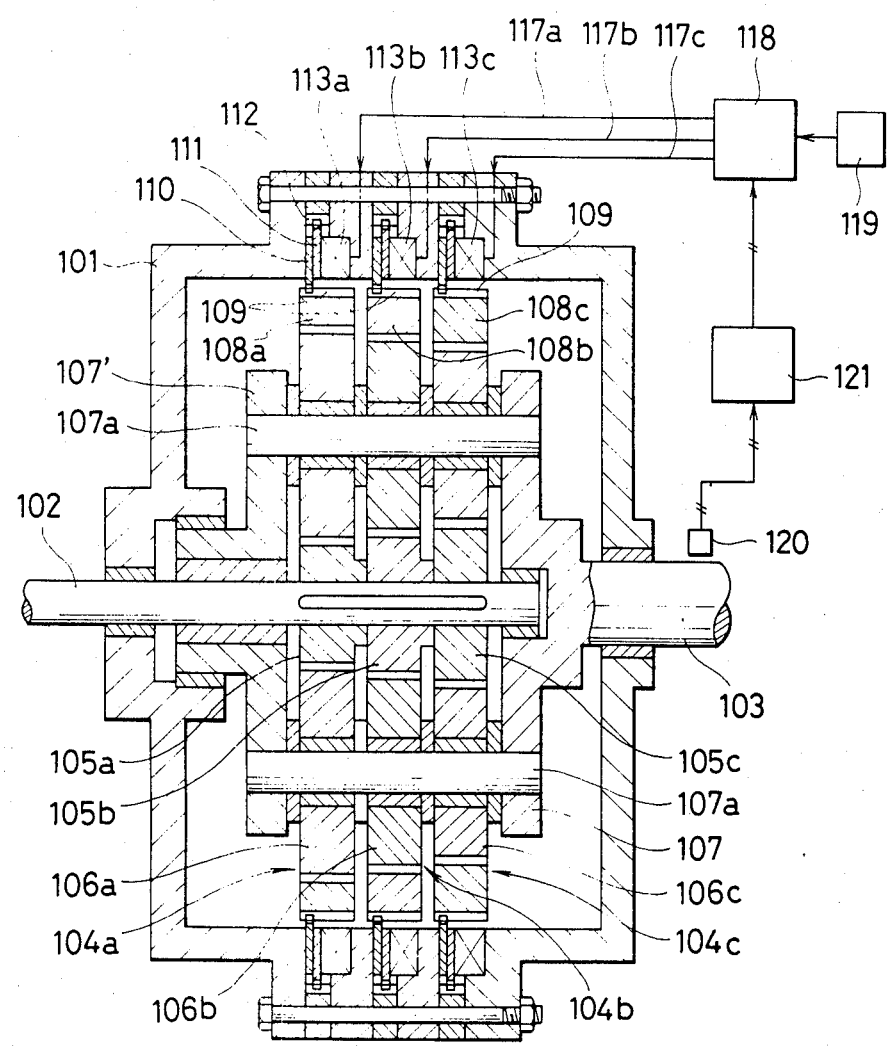

FIG. 5 is a fragmental sectional view of an apparatus for changing rotational speed with the aid of clutching activity in accordance with other embodiment of the invention, particularly illustrating how the ring-shaped bellows serves as a thrust force generating member; and FIG. 6 is a vertical sectional view of an apparatus for changing rotational speed with the aid of clutching activity in accordance with another embodiment of the invention.

THE PREFERRED EMBODIMENTS

Now, the present invention will be described in a greater detail hereunder with reference to the accompanying drawings which schematically illustrate a few preferred embodiments thereof.

Referring first to FIGS. 1 and 2 which illustrate an apparatus for changing rotational speed with the aid of clutching activity (hereinafter referred to simply as apparatus) in accordance with an embodiment of the invention, reference numeral 1 designates a casing which includes an input shaft 2 on the one side, an output shaft 3 on the other side thereof and a planetary gearing mechanism 4 disposed between both the input and output shafts 2 and 3. Specifically, the planetary gearing mechanism 4 essentially comprises a single sun gear 5 fixedly secured to the end part of the input shaft 2, a plurality of planet gears 6 meshing with the sun gear 5 and an inner ring gear 8 meshing with the plural planet gears 6. It should be noted that the inner ring gear 8 is rotatably supported within the casing 1. Each of the planet gears 6 is rotatably held on a shaft 7a which is fixedly attached to a carrier 7 made integral with the output shaft 3.

As will be apparent from the drawings, the inner ring gear 8 is rotatably supported without any necessity for arm or the like holding means operatively associated with the input shaft 2 or the output shaft 3 in such a manner that the plural planet gears 6 are surrounded by the inner ring gear 8 while the former mesh with the latter. The inner ring gear 8 is formed with a number of splines 9 around its periphery so that a ring-shaped frictional plate 10 is axially displaceably engaged to the inner ring gear 8 with the aid of the splines 9. Further, another ring-shaped frictional plate 11 is disposed opposite to the frictional plate 10 so as to axially displace toward or away from the latter with the aid of a number of splines 12 which are formed on the inner wall of the casing 1. In addition, a ring-shaped bellows 13 is fixedly attached to the inner side wall of the casing 1 at the position located adjacent to the frictional plate 11. As will be described later, both the frictional plates 10 and 11 function as a braking plate under the influence of thrusting force imparted by the ring-shaped bellows 13.

The ring-shaped bellows 13 is illustrated merely in the schematic manner in FIG. 1 but its detailed structure is as shown in FIGS. 3(A) and (B). As is apparent from the drawings, the ring-shaped bellows 13 includes a pair of ring-shaped reinforcement plates 14 and 15 located opposite to one another in the spaced relation and their inner and outer peripheral edges are connected to one another by way of inner and outer corrugated cylindrical thin plates 16 having excellent resiliency so that a hydraulic chamber 13a is constituted by the ring-shaped reinforcement plates 14 and 15 and the inner and outer corrugated cylindrical plates 16. The one reinforcement plate 15 is fitted with a conduit 17 which is communicated with the hydraulic chamber 13a whereby pressurized hydraulic oil is introduced into the latter through the conduit 17.

As the hydraulic chamber 13a in the bellows 13 is filled with pressurized hydraulic oil, the bellows 13 is caused to expand in the axial direction until it comes in contact with the frictional plate 11. Thus, both the frictional plates 10 and 11 are displaced together toward the vertical wall surface 1a of the casing 1 by means of the bellows 13 and thereby the inner ring gear 8 is braked under the influence of thrusting force imparted by the frictional plates 10 and 11. On the other hand, when introduction of hydraulic oil is interrupted and it is then discharged from the hydraulic chamber 13a, the ring-shaped bellows 13 is caused to contract in the axial direction by its own resilient force and thereby the frictional plates 10 and 11 are released from the immovable state under the influence of thrusting force. As a result, the inner ring gear 8 resumes the original state where it is supported rotatably.

In the embodiment as illustrated in FIG. 1 two ring-shaped frictional plates 10 and 11 are provided for the purpose of simplification of illustration but the present invention should not be limited only to this. Alternatively, two frictional plates 10 and two frictional plate 11, that is, four frictional plates may be provided as illustrated in FIG. 4. The number of frictional plates employed for the apparatus is properly determined in dependence on required braking force. It should be noted that to inhibit the frictional plates 10 from being disconnected from the inner ring gear 8 stop rings 18 are preferably disposed on the splines 9 outwardly of the frictional plates 10 as illustrated in FIG. 4.

Alternatively, a frictional plate 10' may be made integral with the inner ring gear 8 as illustrated in FIG. 5.

As described above, the rotatably supported inner ring gear 8 becomes immovable when the frictional plates 10 and 11 are brought in frictional contact with one another under the influence of thrusting force imparted by the ring-shaped bellows 13. While the inner ring gear 8 is kept in the immovable state, rotational power inputted to the input shaft 2 is transmitted to the output shaft 3 via the planetary gearing mechanism 4 at a reduced speed rate with the frictional clutching mechanism as constructed in the above-described manner being turned on. Next, when introduction of hydraulic oil is interrupted, the ring-shaped bellows 13 is restored to the original position by its own restorative resilient force, resulting in the frictional plates 10 and 11 being released from the frictional contact. Thus, the inner ring gear 8 resumes the original state where it is supported rotatably. Therefore, rotational power inputted to the input shaft 2 fails to be transmitted to the output shaft 3 via the planetary gearing mechanism 4, because the frictional clutching mechanism is turned off.

FIG. 6 schematically illustrates another embodiment of the present invention where the apparatus is designed in the form of multistage speed changing apparatus.

In FIG. 6 reference numeral 101 designates a casing, reference numeral 102 does an input shaft and reference numeral 103 does an output shaft. Between the input shaft 102 and the output shaft 103 is disposed a multistage planetary gearing mechanism comprising three planetary gearing mechanisms 104a, 104b and 104c with which speed changing ratio is different from each other. Specifically, the planetary gearing mechanisms 104a, 104b and 104c include sun gears 105a, 105b and 105c fixedly mounted on the input shaft 102, a plurality of planet gears 106a, 106b and 106c meshing with the sun gears 105a, 105b and 105c and inner ring gears 108a, 108b and 108c disposed outwardly of the planet gears 106a, 106b and 106c to mesh with the latter. It should be noted that each of the inner ring gears 108a, 108b and 108c is rotatably supported within the casing 101. The planet gears 106a, 106b and 106c are arranged in axial alignment one after another at the position located on a circle of which center is identical to the center of the input shaft 102 so that they are rotatably held on shafts 107a which are bridged between a carrier 107 fixedly mounted on the output shaft 103 and a carrier 107' rotatably mounted on the input shaft 102.

As will be apparent from the drawing, the inner ring gears 108a, 108b and 108c are mounted around the group of corresponding planet gears 106a, 106b and 106c while meshing with the latter but they are not supported either on the input shaft 102 or the output shaft 103 with the aid of arm or the like means. Further, each of the inner ring gears 108a, 108b and 108c is formed with a number of axially extending splines 109 around the periphery thereof and a ring-shaped frictional plate 110 is axially displaceably fitted onto the splines 109 on each of the inner ring gears 108a, 108b and 108c. Another frictional plate 111 is disposed opposite to the frictional plate 110 and it is axially displaceably fitted into a number of splines 112 formed on the inner wall of the casing 101. Both the frictional plates 110 and 111 function as a braking plate in the same manner as in the foregoing embodiment and three ring-shaped bellows 113a, 113b and 113c are provided in the casing 101 corresponding to the planetary gearing mechanisms 104a, 104b and 104c. It should be noted that each of the ring-shaped bellows 113a, 113b and 113c is constructed in the same manner as that in the first mentioned embodiment.

The ring-shaped bellows 113a, 113b and 113c have conduits 117a, 117b and 117c connected thereto through which pressurized hydraulic oil flows and they are in communication with a hydraulic oil supply source 119 via a single switching valve 118. This switching valve 118 is adapted to selectively establish communication between the hydraulic oil supply source 118 and one of the conduits 117a, 117b and 117c when it is actuated. An arrangement is made such that when the switching valve 118 is actuated, pressurized hydraulic oil delivered from the supply source 119 is introduced into one of the ring-shaped bellows 113a, 113b and 113c or it is not introduced into any of them. When the switching valve 118 is actuated to the position where the first mentioned selective introduction is effected, only the ring-shaped bellows with pressurized hydraulic oil filled therein is caused to expand in the axial direction whereby the corresponding inner ring gear is braked. This causes rotational power inputted to the input shaft 102 to be transmitted to the output shaft at a different rotational speed via the stage of planetary gearing mechanism including the inner ring gear which has been braked in that way. In the last mentioned case where the switching valve 118 is fully closed, any one of the ring-shaped bellows is not supplied with pressurized hydraulic oil and thereby rotational power inputted to the input shaft 102 fails to be transmitted to the output shaft, because the frictional clutching mechanism as constructed in the above-described manner is turned off.

Actuation of the switching valve 118 may be effected manually. Alternatively, the same may be effected automatically as illustrated in FIG. 6 by way of the steps of detecting the number of revolutions or torque with the aid of a detector 120 disposed in the proximity of the output shaft 103 or a detector (not shown) disposed in the proximity of the input shaft 102, transmitting detection signal to a control apparatus 121 and initiating actuation of the switching valve 118 in response to output signal processed in the control apparatus 121.

Since the apparatus in accordance with the above-described embodiments of the present invention includes a single or a plurality of ring-shaped bellows located around the periphery of the inner ring gear(s) to brake the latter which have the ring-shaped configuration, they can be compactly housed within a narrow space located outwardly of the inner ring gear(s). Further, since the ring-shaped area extending around the whole periphery of the inner ring gears serves as working surface, a very high intensity of braking thrust force can be generated in spite of the compact arrangement of the frictional clutching mechanism made in that way. Further, since the ring-shaped bellows have no necessity for precise machining as is the case with the conventional hydraulic cylinder and moreover it has no occurrence of leakage of hydraulic oil, braking thrust force can be generated at a high working efficiency.

Braking force thus generated is exerted on the inner ring gears in the axial direction relative to the apparatus but not in the radial direction. Accordingly, there do not occur such malfunctions as displacement of inner ring gears in the radial direction, double meshing of an inner ring gear with plural planet gears due to eccentric displacement of the former or the like, resulting in no noise being produced and no gear wearing for an excessively short period of time. Further, since the ring-shaped bellows have restorative resilient force, they resume their original position by their own resilient force as soon as hydraulic oil filled therein is discharged and thereby the frictional clutching mechanism can be turned off reliably.

Further, since an inner ring gear is rotatably supported around a plurality of planet gears without necessity for holding it either on the input shaft or the output shaft with the aid of arm or the like means, no extra space is required for housing such an arm or the like holding means. Thus, the whole apparatus can be designed and constructed more compactly.

The present invention has been described above with respect to the illustrated embodiments where rotational power is transmitted to the output shaft at a reduced rotational speed but it should not be limited only to this. Alternatively, the present invention may be applied to a case where power is inputted to the output shaft in the illustrated embodiments and it is then outputted from the input shaft in the same so that it is outputted from the apparatus at an increased rotational speed. In the illustrated embodiments ring-shaped bellows are caused to expand under the influence of pressurized hydraulic oil and contract with the latter being discharged. Alternatively, hydraulic oil may be replaced with other fluid which can be pressurized.

Ring-shaped bellows are preferably made of a thin steel plate but any other material may be employed which can stand against inner pressure when they are caused to expand and has a self-restorative resilient nature which allows them to resume their original state when inner hydraulic pressure is released.

I claim:

1. An apparatus for changing rotational speed with the aid of clutching activity essentially comprising:
   a plurality of planetary gearing mechanisms each having a different speed changing ratio and being arranged in series in an axial direction of said apparatus to define a multistage structure,
   each of said gearing mechanisms including a sun gear, a plurality of planet gears, and an inner ring gear,
   the sun gears of said gearing mechanisms being supported on a common shaft, and the planet gears of said gearing mechanisms being supported in alignment on axially extending common shafts;
   said gearing mechanisms being disposed in a casing between an input shaft and an output shaft with said inner ring gears being rotatably incorporated therein, said inner ring gears being rotatably supported entirely free from both of the input and output shafts;
   each of said gearing mechanisms having associated therewith ring-shaped braking plate means comprising an opposing pair of frictional plates, a respective one of each of said pairs of plates being located at the outer periphery of a respective one of said inner ring gears to rotate together therewith, and a respective other one of each of said pairs of plates being axially displaceably fitted into the inner periphery of the casing, said respective one of each of said pairs of plates being located opposite to said respective other one of each of said pairs of frictional plates; and
   ring-shaped bellows disposed radially outwardly of said plurality of planetary gearing mechanisms and being provided for each stage of said multistage structure, each of said bellows being made of a steel plate having a thin thickness, each of said bellows being located opposite to one of said braking plate means and being adapted to selectively receive pressurized fluid therein so that said bellows will expand in the axial direction when pressurized fluid is filled therein and contract in the axial direction when it is discharged therefrom, whereby at least a selected one of said ring-shaped bellows is adapted to exert a thrust on a respectively associated braking plate means to brake the respectively associated inner ring gear when said one selected bellows is caused to expand,
   whereby said multi-stage structure, when said pressurized fluid actuates one or more of said ring-shaped bellows, operates as a multi-stage speed changing apparatus.

2. An apparatus as defined in claim 1, wherein each said ring-shaped frictional plate located on the outer periphery of the respectively associated inner ring gear is fitted onto the latter with the aid of a number of splines.

3. An apparatus as defined in claim 1, wherein each said ring-shaped frictional plate located on the outer periphery of the respectively associated inner ring gear is made integral with the latter.

4. An apparatus as defined in claim 1, wherein said pressurized fluid is pressurized hydraulic oil.

* * * * *